No. 686,698. Patented Nov. 19, 1901.
C. BAER.
BLINDER FOR BRIDLES.
(Application filed Apr. 26, 1901.)

(No Model.)

Witnesses
Howard W. Orr
R. M. Elliott

Inventor:
Charles Baer,
By
E. G. Siggers
Attorney

UNITED STATES PATENT OFFICE.

CHARLES BAER, OF MENDON, MICHIGAN.

BLINDER FOR BRIDLES.

SPECIFICATION forming part of Letters Patent No. 686,698, dated November 19, 1901.

Application filed April 26, 1901. Serial No. 57,574. (No model.)

*To all whom it may concern:*

Be it known that I, CHARLES BAER, a citizen of the United States, residing at Mendon, in the county of St. Joseph and State of Michigan, have invented a new and useful Blinker or Blinder for Bridles, of which the following is a specification.

This invention relates to blinkers or blinders for bridles, and more particularly to that class wherein the blinkers are operable by the driver to blindfold the horse when required.

The object of the invention is in a simple, thoroughly efficient, rapid, and at once perfectly humane manner to effect blindfolding of a horse when required, thereby to prevent runaways and other accidents caused by timidity or viciousness of the animal.

The device of the present invention is designed to combine great simplicity of construction and efficiency in use with cheapness of production and ready adaptability to position on bridles of the ordinary make without necessitating any change in the structural arrangement of the same.

With the objects above stated in view the invention consists, generally stated, in combining with the cheek-strap of a bridle a rod or bar mounted for rotary movement on the strap, the bar carrying near one end a blinker and at the opposite end an arm by which the rod may be rotated to move the blinker inward to cover the animal's eye, release of the blinker from the animal's eye being effected automatically by a spring coacting with the rod or bar. As a matter of specific improvement the blinker is adjustably connected with the rod or bar, thereby to permit the blinker being adjusted to fit comfortably the horse on which the bridle may be used.

Further and more specific details of construction will be hereinafter more fully described and claimed.

In the accompanying drawings, forming a part of the specification, and in which like numerals of reference indicate corresponding parts, I have illustrated a form of the embodiment of my invention capable of carrying the same into effective operation, it being understood that other forms of embodiment of the same may be employed without departing from the spirit of the invention, and in these drawings—

Figure 1:
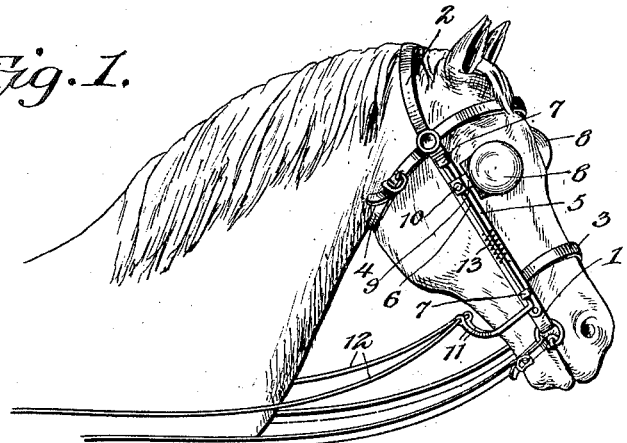
Figure 2:
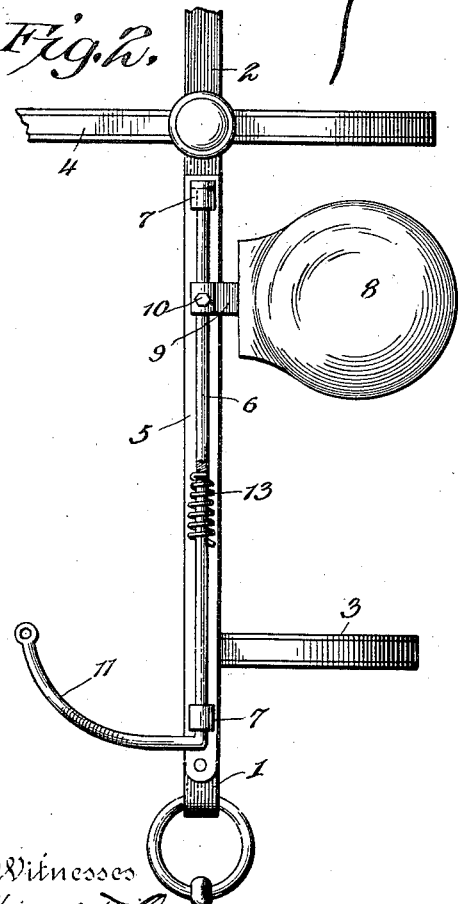
Figure 3:
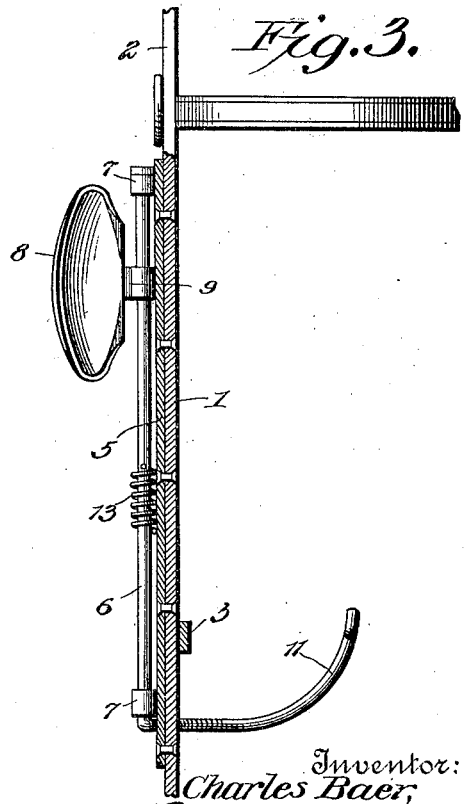

Figure 1 is a view in elevation exhibiting a horse's head with my improved bridle in position thereon. Fig. 2 is a view in side elevation, on an enlarged scale, of the bridle removed. Fig. 3 is a view in front elevation, partly in section, displaying certain parts not clearly shown in Fig. 2.

Referring to the drawings, 1 designates the cheek-strap, 2 the head-strap, 3 the nose-strap, and 4 the throat-strap, of a bridle, which may be of any ordinary or preferred construction. As the arrangement of these parts is well understood, detailed description thereof is deemed unnecessary. Upon the cheek-strap 1 is secured a flat strip of metal 5, this for the purpose of reinforcing a portion of the length of cheek-strap to cause it when in use always to occupy a practically straight plane, the plate to be secured to the cheek-strap in any preferred manner, as by being riveted thereto. The metallic strip may be of steel or any other preferred metal; but by reason of its resiliency steel would generally be preferred. Carried by the cheek-strap is a rod or bar 6, the same being supported on the plate 5 by bearings 7, these bearings to be separate elements and to be secured to the plate 4, or may be formed by bending the two extremities of the plate at right angles to its length and providing these bent portions with orifices in which the rod will work. The plate 5 is of a length to extend but a short distance above the horse's eye, as it is requisite that the bridle should be as flexible as possible, so as to render it easy and comfortable for the animal to wear. While the plate is shown as extending but a short distance above the animal's eye and terminating at a point adjacent to the bit-ring, it is to be understood that it may be made longer or slightly shorter without departing from the spirit of my invention. Upon the upper portion of the rod or bar 6 is adjustably mounted the blinker 8, the same being constructed, preferably, of leather and stamped or otherwise formed into concavo-convex shape in cross-section, thereby to cause it to conform to the bulge of the forehead over the animal's eye, so that when closed inward it will effect complete blindfolding. The blinker is supported upon the rod by a metallic plate or projection 9, which may be secured to the blinker in any preferred manner, the plate being provided with a head or guide through which the rod or bar passes, a set-screw 10, carried by the plate 9, serving to hold the blinker at the desired adjustment on the rod requisite to cause the blinker to effect proper coaction with the horse's eye. The lower portion of the rod carries an arm or projection 11, which is bent inward to lie back of the horse's back jaw and curved upward to be out of the way of the lines, the arm having attached to it a cord or strap 12, leading to the driver. The arm may, as shown, be an integral part of the rod or bar 6 or may be made as a separate element and secured thereto.

As in the case of ordinary bridles, the blinkers will normally be out of engagement with the animal's eye, and to effect this the rod 6 carries a coiled spring 13, one end of which is firmly secured to the rod and the other end bears upon the plate 5. This spring not only serves to keep the blinker normally out of engagement with the animal's eye, but also effects automatic return of the blinker to its normal position when it has been turned by drawing upon the cord 12 when it is desired to blindfold the horse.

In the description given I have referred to but one blinker and one each of the parts coacting therewith, this being all that is necessary to render easy an understanding of the device, as it will be of course understood that the parts are duplicated on each side of the bridle, so that a description of one-half of the bridle will serve for both.

It is to be understood that in use both of the blinkers need not be brought over the animals's eyes at the same time, as, if an object on the right-hand side of the road would be in danger of startling the animal, it might be necessary only to close the blinker on that side. In the case of runaways or where the object frightening the animal is directly in front both of the blinkers will be moved to cover the animal's eyes.

It will be seen from the foregoing description that this device cannot fail to be thoroughly effective for accomplishing the objects designed, that by reason of its construction it will not give objectionable added weight to the bridle nor objectionable added expense in the production thereof, that it will be thoroughly humane in operation, not giving any pain to the animal, and that it will be sightly in appearance.

It is to be understood that while the form of blinker illustrated will be that generally preferred I do not limit my invention to the particular arrangement shown, as various other forms of blinkers may be employed and still be within the scope of my invention.

Having thus described the invention, what I claim is—

1. The combination with a cheek-strap of a bridle, of a plate secured thereto and provided near its upper and lower ends with bearings, a rod or bar mounted in the bearings and having its lower end curved upward and inward, a blinker adjustably connected with the upper portion of the rod or bar, and a coiled spring on the rod, one end of which is housed in an opening in the rod and the other end bears against the plate.

2. The combination with the cheek-strap of a bridle, of a metallic plate secured thereto, bearings carried by the plate, a rod or bar mounted for rotary movement in the bearings and having its lower end formed into an arm curved upward and inward from the rod or bar, a blinker having a shank connected with the rod or bar, and a set-screw carried by the shank to effect adjustment of the blinker on the bar, and a coiled spring carried by the bar, one end of the spring being housed in an opening in the bar and the other end bearing against the plate.

3. The combination with a bridle including a cheek-strap and a bit, of a plate secured to the cheek-strap and provided with bearings adjacent to its opposite ends, a rod mounted for rotary movement in said bearings and provided with a crank-arm located at a point above the lower end of the cheek-strap, a blinker connected to the rod adjacent to the upper bearing and designed to be moved toward or from the eye of a horse by the rotation of the rod, adjustable retaining means connecting the blinker to the rod in a manner to permit the adjustment of the blinker laterally or longitudinally with respect to the rod, and a spring encircling the rod to return the blinker to its normal position.

4. The combination with a bridle including a cheek-strap, of a metal plate secured upon said cheek-strap and terminating short of the ends thereof to retain the flexibility of said strap, bearing members outstanding from the plate adjacent to its opposite ends, a rod rotatably mounted in said bearings, and formed upon its lower end below the lower bearing with an arm curved upward and inward from the rod, a blinker provided with a shank having a sleeve encircling the rod, a set-screw carried by the sleeve and bearing against the rod to facilitate the adjustment of the blinker either laterally or longitudinally of the rod to accommodate the blinker to the eyes of different horses, and a spiral spring encircling the rod and secured at its opposite ends to the rod and plate, respectively, to return the blinker to its normal position.

In testimony that I claim the foregoing as my own I have hereto affixed my signature in the presence of two witnesses.

CHARLES BAER.

Witnesses:
ALFRED BODIN,
EDW. F. HACKMAN.